United States Patent
Kidder et al.

(10) Patent No.: US 12,246,309 B2
(45) Date of Patent: Mar. 11, 2025

(54) CATALYTIC POROUS POLYMER FOR SELECTIVE CAPTURE AND REDUCTION OF CARBON DIOXIDE

(71) Applicant: UT-Battelle, LLC, Oak Ridge, TN (US)

(72) Inventors: Michelle K. Kidder, Oak Ridge, TN (US); Luke Daemen, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 80 days.

(21) Appl. No.: 18/100,664

(22) Filed: Jan. 24, 2023

(65) Prior Publication Data

US 2023/0234042 A1    Jul. 27, 2023

Related U.S. Application Data

(60) Provisional application No. 63/303,070, filed on Jan. 26, 2022.

(51) Int. Cl.
| | |
|---|---|
| B01J 31/16 | (2006.01) |
| B01J 35/50 | (2024.01) |
| B01J 35/59 | (2024.01) |
| B01J 35/61 | (2024.01) |
| B01J 37/00 | (2006.01) |
| B01J 37/04 | (2006.01) |
| B01J 37/06 | (2006.01) |
| C08G 73/02 | (2006.01) |

(52) U.S. Cl.
CPC ........... *B01J 31/1658* (2013.01); *B01J 35/50* (2024.01); *B01J 35/59* (2024.01); *B01J 35/615* (2024.01); *B01J 35/617* (2024.01); *B01J 37/009* (2013.01); *B01J 37/04* (2013.01); *B01J 37/06* (2013.01); *C08G 73/026* (2013.01); *B01J 2231/625* (2013.01); *B01J 2531/821* (2013.01)

(58) Field of Classification Search
CPC ............ B01J 2531/821; B01J 2231/625; B01J 35/617; B01J 35/615
See application file for complete search history.

(56) References Cited

PUBLICATIONS

Yang et al., A Troger's base-microporous organic polymer: design and application in CO2/H2 capture and hydrogenation of CO2 to formic acid (Chem. Communication 2015, 51, 1271-1274).*

Tamboli et al., "Catalytic Developments in the Direct Dimethyl Carbonate Synthesis From Carbon Dioxide and Methanol," Chemical Engineering Journal 323 (2017) pp. 530-544.

(Continued)

*Primary Examiner* — Jafar F Parsa

(74) *Attorney, Agent, or Firm* — WARNER NORCROSS + JUDD LLP

(57) ABSTRACT

A catalytic carbon capture material is provided. The catalytic carbon capture material includes a microporous polymer including a Tröger's base moiety, and a transition metal is coordinated within the microporous polymer. The catalytic carbon capture material selectively captures carbon dioxide ($CO_2$) and also is a catalyst that simultaneously converts the captured carbon dioxide into one or more carbon dioxide-based products. A method of making the catalytic carbon capture material and a method of selective carbon dioxide capture and conversion are also provided.

14 Claims, 7 Drawing Sheets

(56) References Cited

PUBLICATIONS

Gunasekar et al., "Recent Developments in the Catalytic Hydrogenation of CO2 to Formic Acid/Formate Using Heterogeneous Catalysts," Inorganic Chemistry Frontiers vol. 3, No. 7 (Jul. 2016) pp. 882-895.

Zhu et al., "Efficient CO2 Capture by a 3D Porous Polymer Derived from Troger's Base," ACS Macro Letters, vol. 2 (2013) pp. 660-663.

Wang et al., "Polymers of Intrinsic Microporosity/Metal-Organic Framework Hybrid Membranes with Improved Interfacial Interaction for High-Performance CO2 Separation," J. Mater. Chem. A., vol. 5 (2017) pp. 10968-10977.

Bhanja et al., "Porous Organic Polymers for CO2 Storage and Conversion Reactions," ChemCatChem, vol. 11 (2019) pp. 244-257.

* cited by examiner

CATALYTIC POROUS POLYMER FOR SELECTIVE CAPTURE AND REDUCTION OF CARBON DIOXIDE

CROSS-REFERENCE TO RELATED APPLICATIONS

This application claims the benefit of U.S. Provisional Application 63/303,070, filed Jan. 26, 2022, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to capture and utilization of carbon dioxide, and more particularly to a carbon capture material for the selective capture of carbon dioxide and conversion into useful products.

BACKGROUND OF THE INVENTION

The level of greenhouse gases (primarily water vapor, carbon dioxide, methane, nitrous oxide, and ozone) in the atmosphere is important due to its effect on Earth's average surface temperature. Increased carbon dioxide ($CO_2$) production and emission in the last 300 years has been one of the largest culprits in the rising level of atmospheric greenhouse gases, which threatens to increase the average surface temperature on Earth. There has been an international effort to limit this increase in average surface temperature to below 2° C. Mitigation of global warming has included use of renewable energy, increase in energy efficiencies, and carbon capture and storage (CCS) of emissions from fossil-fuel power plants and other sources of carbon dioxide emissions. A variety of technologies have been utilized for capture of carbon dioxide before it enters the atmosphere, which is generally referred to as point source capture. For example, carbon dioxide can be captured from concentrated flue gas streams at industrial chemical plants and biomass power plants. Recently, mitigation efforts have expanded to include removal of carbon dioxide from the atmosphere for storage in geologic reservoirs. These so-called negative emissions technologies (NETs) include carbon dioxide direct air capture (DAC) and carbon capture and storage (CCS) such as bioenergy carbon capture and storage (BECCS). NETs are considered essential in reducing the concentration of carbon dioxide in the atmosphere.

Direct air capture (DAC) involves directly pulling carbon dioxide out of the ambient air/atmosphere and can be useful to reduce atmospheric levels of carbon dioxide gas that cannot be controlled by other means such as point source capture, reduced carbon dioxide generation/emission, and reduced deforestation. Direct air capture is typically accomplished with a DAC system that is implemented in a stand-alone DAC plant. The cost expected for DAC of carbon dioxide, however, is much higher than the cost of CCS because of the low concentration of carbon dioxide in the atmosphere (presently at a level of approximately 400 ppm) compared to that in power plant emissions (approximately 13%). Particularly, BECCS is more economical than DAC because biomass generated during carbon dioxide removal from the atmosphere can be used to produce electricity, thus generating revenue while also reducing the atmospheric concentration of carbon dioxide. However, conversion of biomass to energy can lead to greater carbon dioxide emissions than conventional natural gas and coal power plants. The much higher carbon dioxide concentration in biomass-conversion emissions poses some challenges for carbon-dioxide-capture technologies such as BECCS.

Despite these efforts, the concentration of carbon dioxide in the atmosphere continues to steadily rise and is predicted to reach approximately 570 ppm by the end of the 21st century. There remains a need to reduce the level of carbon dioxide that is released into and present in ambient air due to daily carbon dioxide emissions from various sources, and to develop ways to effectively and efficiently manage carbon dioxide that is captured from these sources. One solution is to utilize captured carbon dioxide as a feedstock for the production of organic chemicals, fuels, and other materials. In this regard, carbon dioxide hydrogenation processes for forming valuable products have typically relied upon homogenous catalysts, while use of heterogeneous catalysts such as polymers is rare. Additionally, while certain polymers have been shown to have the ability to separate/capture gases such as carbon dioxide, nitrogen, and carbon monoxide, these polymers do not have the ability to catalyze the conversion of carbon dioxide to other chemical compounds. Further, conventional carbon capture and conversion processes first require the capture and release (adsorption and desorption) of carbon dioxide, followed by subsequent conversion of carbon dioxide to useful products. Such processes are inefficient and require high energy inputs to accomplish the release and/or conversion of carbon dioxide. Thus, a need exists for a material that can achieve separation of effluents, conversion of carbon dioxide at low temperature and pressure, production of desired products with high yield and purity, and efficient desorption of the end products with minimal input of energy.

SUMMARY OF THE INVENTION

A material for catalytic carbon capture is provided. The chemical and physical structure of the material allows for facile carbon capture material designed as a microporous polymer including a Tröger's base moiety that acts as a sorption and chelation site. A transition metal is coordinated within the microporous polymer rendering it catalytically active. The catalytic material has a high selectivity towards the sorption of carbon dioxide ($CO_2$) and also is a catalyst that simultaneously converts the captured carbon dioxide into value-added chemicals through use of low temperatures (as low as 25° C.) and low pressure (as low as 60 bar).

In specific embodiments, the transition metal is one selected from the group consisting of ruthenium (Ru), iridium (Ir), iron (Fe), copper (Cu), zirconium (Zr), nickel (Ni), and rhodium (Rh).

In certain embodiments, the material includes a metal chloride that comprises the transition metal.

In specific embodiments, the microporous polymer is formed of (i) diaminotoluene or 9,9'-spirobi[fluorene]-2,2'-diamine precursors (or derivatives there-of which are diamino aromatic systems), and (ii) dimethoxymethane precursors.

In specific embodiments, the material has a specific surface area in the range of approximately 500 to 700 $m^2/g$.

In some embodiments, the catalytic carbon capture material is in the form of a pellet or powder.

In other embodiments, the catalytic carbon capture material is in the form of a membrane.

In specific embodiments, the material is dispersed in a solvent.

In certain embodiments, the solvent is triethylamine or methanol.

A method of selective carbon dioxide capture and conversion is also provided. The method includes providing the catalytic carbon capture material. Carbon dioxide gas is introduced to the material, and the carbon dioxide gas is adsorbed by the catalytic carbon capture material and simultaneously converted into a carbon dioxide-based product while adsorbed by the carbon capture material.

In specific embodiments, the step of converting the carbon dioxide gas into a carbon dioxide-based product includes introducing a hydrogen source such as hydrogen gas (or other hydrogenous materials such as methanol) to the carbon capture material to hydrogenate the carbon dioxide.

In specific embodiments, the carbon dioxide-based product is one of formic acid, formate, dimethylcarbonate, and furandicarboxylic acid.

In specific embodiments, the catalytic carbon capture material selectively and rapidly adsorbs carbon dioxide over nitrogen gas ($N_2$) and methane ($CH_4$).

In specific embodiments, the process is carried out at a temperature in the range of approximately 25° C. to 40° C. and a total pressure of up to approximately 60-100 bar.

In specific embodiments, the catalytic carbon capture material is in the form of a pellet, a powder, or a membrane.

A method of making the catalytic carbon capture material is also provided. The method includes forming the microporous polymer in solution. The method further includes filtering the solution to isolate the microporous polymer. The method further includes rinsing and drying the microporous polymer. The method further includes dissolving the microporous polymer in an alcohol for purification. The method further includes adding the dissolved microporous polymer to a solution of metal chloride hydrate in an alcohol to coordinate the metal chloride with the microporous polymer. The method further includes filtering, rinsing, and drying the microporous polymer coordinated with the metal chloride.

In specific embodiments, the microporous polymer is formed of: one of 2,6-diaminotoluene or 9,9'-spirobi[fluorene]-2,2'-diamine precursors; and (ii) dimethoxymethane precursors.

In specific embodiments, the metal chloride hydrate is a metal (i.e., ruthenium, iron, copper, rhodium. iridium, or nickel) chloride hydrate.

These and other features of the invention will be more fully understood and appreciated by reference to the description of the embodiments and the drawings.

DETAILED DESCRIPTION OF THE CURRENT EMBODIMENTS

As discussed herein, the current embodiments relate to a catalytic carbon capture material, a method of making a catalytic carbon capture material, and a method of selective carbon dioxide capture and conversion. The catalytic carbon capture material includes a microporous polymer. The microporous polymer has intrinsic microporosity due to its contorted shape and fused ring structure that provides a rigid polymer backbone, forming a continuous network of interconnected intermolecular voids each being less than approximately 2 nm in width. The microporous polymer includes a Tröger's base moiety (basic tertiary amine) that is embedded into the backbone of the polymer and has a bent-ring structure including two tertiary nitrogen atoms in the ring. The Tröger's base unit included within the microporous polymer provides considerable affinity of carbon dioxide due to the presence of the amine, and the size of the micropores provides significantly enhanced capacity. For example, the microporous polymer with the Tröger's base moieties may have a high specific surface area in the range of 500 to 700 $m^2/g$.

A transition metal is coordinated within the microporous polymer. Particularly, the transition metal may form coordinate bonds with the nitrogen atoms in the Tröger's base. The transition metal may be, for example, ruthenium (Ru), iridium (Ir), iron (Fe), copper (Cu), zirconium (Zr), nickel (Ni), and rhodium (Rh), or any other metal that is capable of catalyzing the conversion of carbon dioxide into products (e.g., carbon dioxide is used as a reactant in the production of useful end products). Choice of the transition metal may be dependent upon the desired carbon-dioxide-derived end product. For example, when ruthenium is used as the transition metal, the carbon capture material exhibits high efficiency for conversion of carbon dioxide into formic acid or formate. The amine unit of the Tröger's base provides close molecular proximity of transition metal ions with the captured carbon dioxide while also provided catalytic carbon dioxide bond activation, thereby enabling simultaneous capture and chemical conversion of carbon dioxide.

The catalytic carbon capture material is made by combining two or monomer components in solution, wherein the polymerization occurs in solution over a period of time (hours, days, e.g., 40 hours, approximately 2 days, and the like). After polymerization is complete, the solution is filtered to isolate the solid microporous polymer, which is rinsed and dried. Next, the dried microporous polymer is dispersed in alcohol, and the polymer/alcohol solution is added to a solution of a metal hydrate in alcohol, whereby the metal forms coordinate bonds with the nitrogen of the microporous polymer. The resulting hybrid microporous polymer catalyst is filtered out of the solution, and the isolated hybrid microporous polymer catalyst is rinsed and finally dried to obtain the final catalytic carbon capture material.

Figure 1:
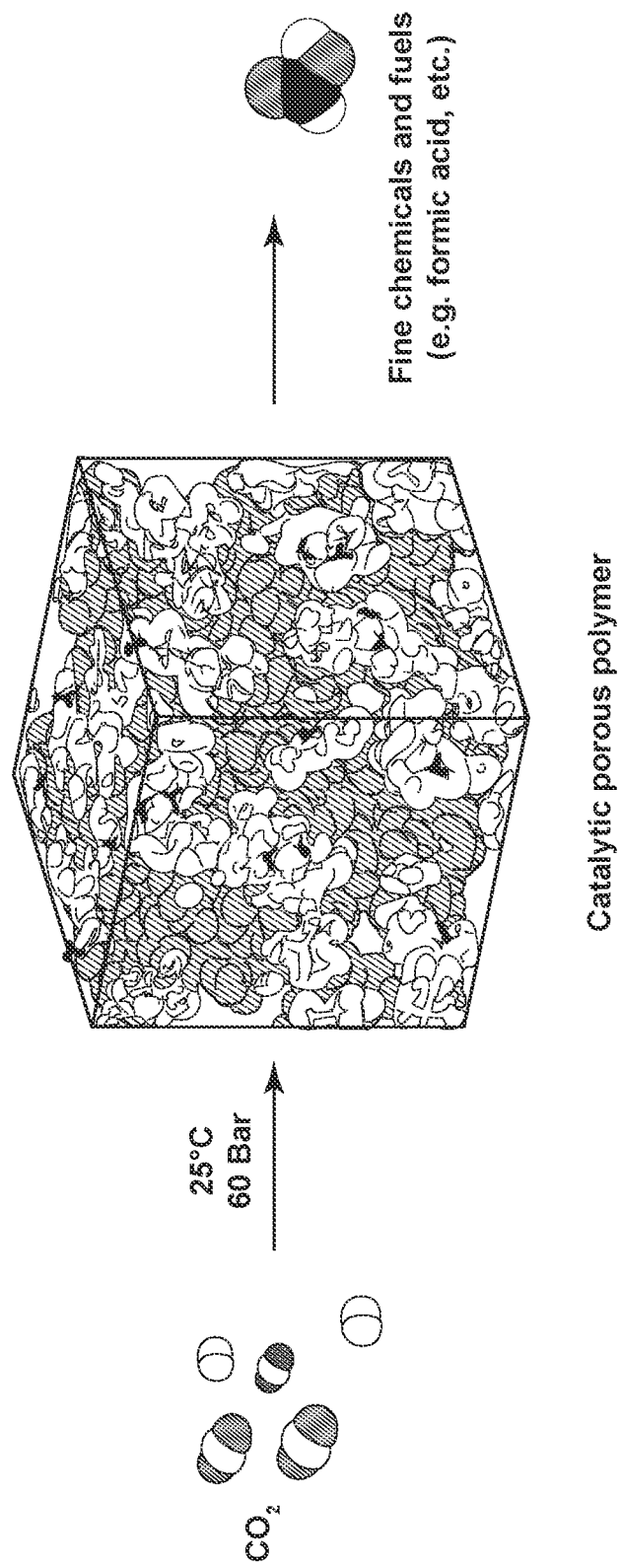
FIG. 1 is a schematic illustration of a method of selective, simultaneous carbon dioxide capture and conversion in accordance with some embodiments of the disclosure.
Figure 2:
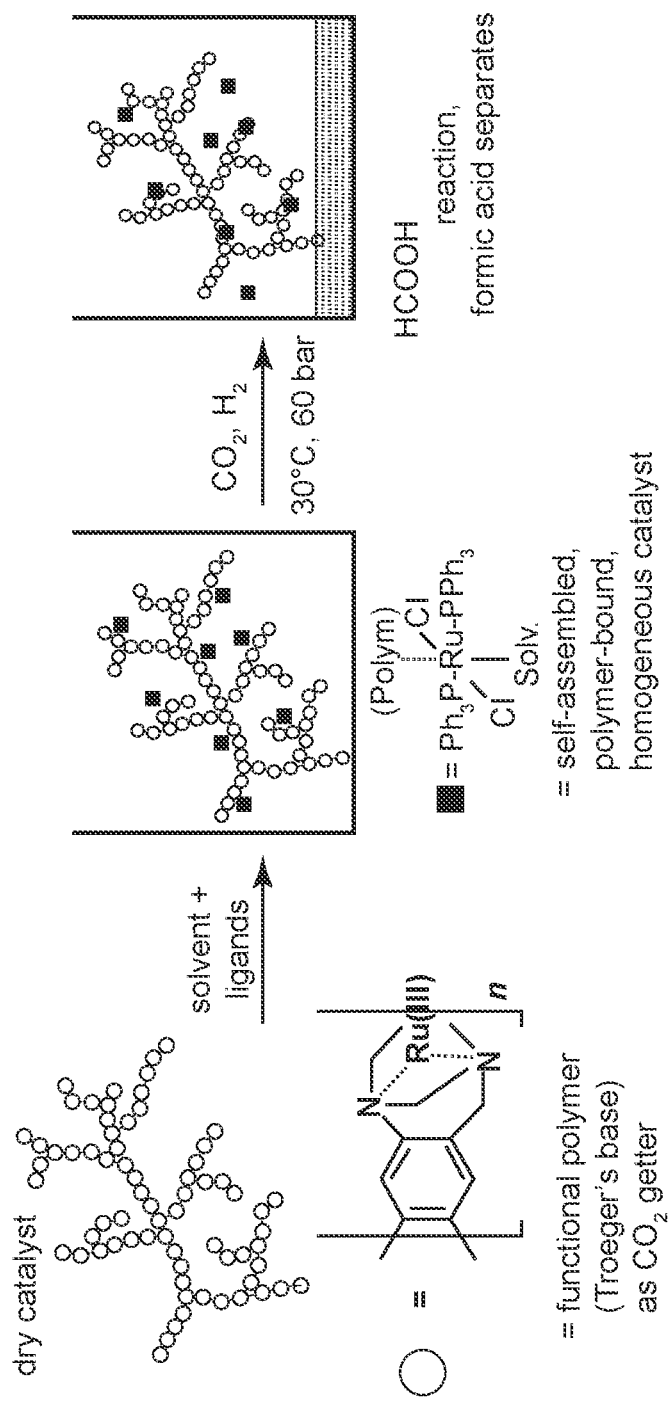
FIG. 2 is a schematic illustration of the synthetic method of material and conversion pathway of selective, simultaneous carbon dioxide capture and conversion in accordance with specific embodiments of the disclosure.

As shown in FIGS. 1 and 2, to selectively capture and convert carbon dioxide to useful products, the carbon capture material can be integrated into a filtration system. For example, the carbon dioxide capture material may be formed into pellets that are loaded into a fluidized bed, or the catalytic carbon capture material may be formed into an integrated moving bed. A stream of gas including carbon dioxide, such as a flow of ambient air (e.g., direct air capture of carbon) or an industrial exhaust stream, is passed through the catalytic carbon capture material. The catalytic carbon capture material adsorbs the carbon dioxide present in the gas stream. Simultaneously, a stream of reactant such as hydrogen gas is also introduced to the catalytic carbon capture material, and the adsorbed carbon dioxide reacts with the reactant via the presence of the transition metal catalyst in the catalytic carbon capture material. In this example, carbon dioxide and hydrogen react to form formic acid. However, by changing the reactant and/or the catalyst metal, other products such as but not limited to dimethylcarbonate, furandicarboxylic acid, or formate may be obtained.

The present hybrid-porous polymer catalyst carbon capture material advantageously serves the dual purpose as both an active carbon dioxide getter (by capturing $CO_2$) and a passive catalytic site support for the conversion of $CO_2$ into other useful chemical compounds. For example, 270 mg (6 mmol) of $CO_2$ may be captured for every gram of the carbon capture catalyst material. The porosity of the carbon capture catalyst allows for rapid diffusion of $CO_2$ to the active sites and hence permits the use of the catalyst at lower temperatures and intermediate pressures such as, but not limited to, 30° C. and 60 bar total pressure of $CO_2$ plus $H_2$. In some embodiments, the catalytic hybrid-porous polymer carbon capture material can be used as a powder, while in other embodiments it can be pelletized and included in fluidized beds for continuous processes.

Figure 3:
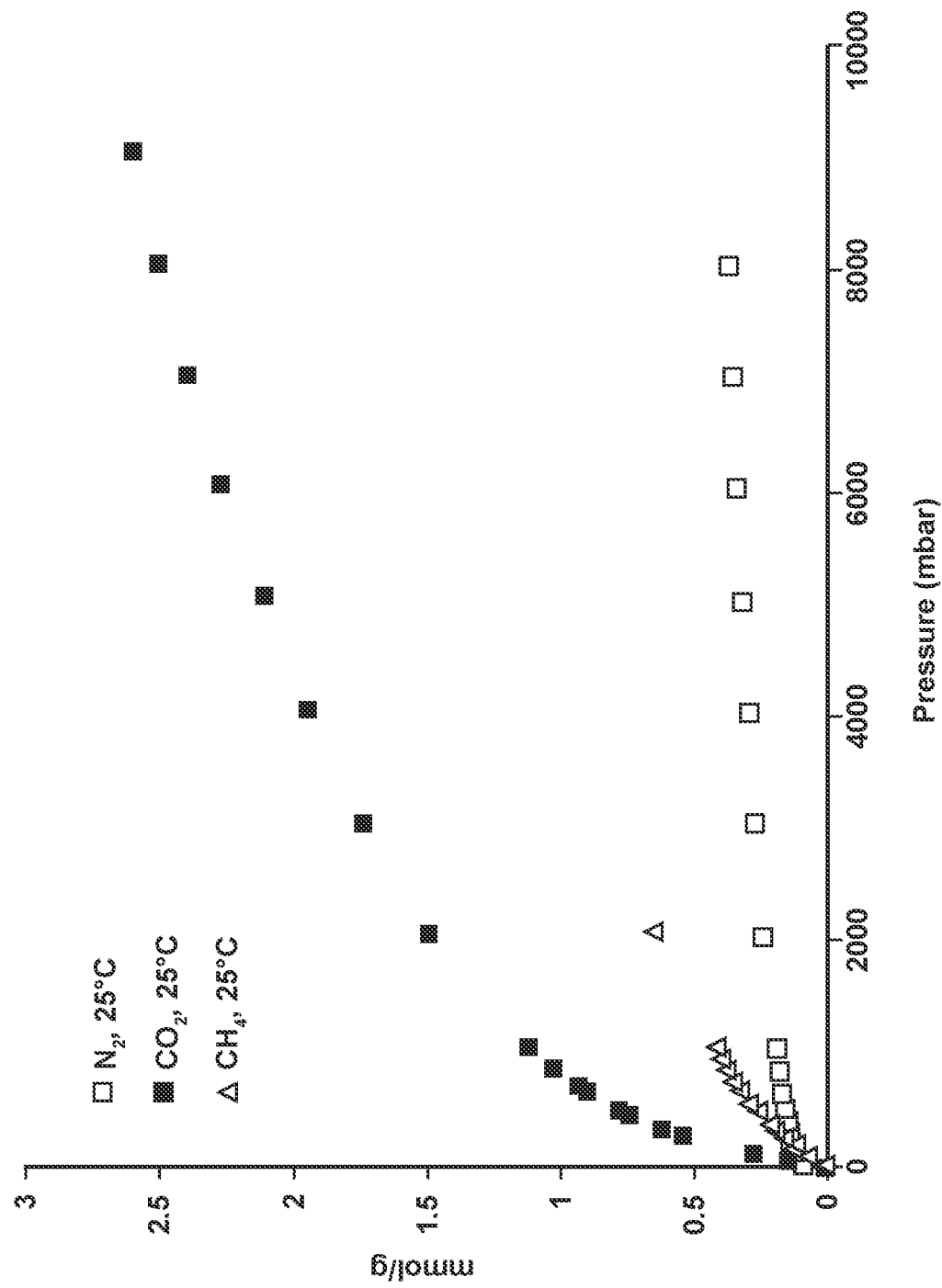
FIG. 3 is a graph of the selectivity and capacity up to 10 bar of a hybrid-porous polymer catalyst carbon capture material (mmol/g) in accordance with some embodiments of the disclosure.

As shown in FIG. 3, the hybrid-porous polymer catalyst carbon capture material demonstrated selective capture of $CO_2$ over $N_2$ (e.g., 26:1 of $CO_2:N_2$) as well as over $CH_4$ (which makes the present catalyst useful in filtering byproducts such as those found in natural gas combustion processes).

The ability to produce formic acid from captured carbon dioxide with the addition of hydrogen at low temperature and pressure is industrially advantageous. Current production processes for formic acid involve the reaction of toxic carbon monoxide and methanol, which also requires the separation of impurities. Due to the expense and impurity of the obtained formic acid, many industrial applications using formic acid, e.g. as a silage additive for cattle and chicken feed, for deicing of planes, for enhanced oil recovery and so on, have moved to other cheaper but inefficient processes. Further, conventional production of formic acid emits about 3076 kg $CO_2$ per ton of formic acid obtained, whereas only 100 kg $CO_2$ is emitted in the present carbon dioxide hydrogenation process using the hybrid-porous carbon capture catalyst material.

In addition to the formation of formic acid, metals other than Ru can be used at the catalytic site and the conditions changed (e.g., feed material, temperature, pressure) to green-produce other chemicals such as formate, dimethylcarbonate, or furandicarboxylic acid from the source of carbon dioxide that is captured. Conventional synthetic pathways for dimethylcarbonate and furandicarboxylic acid are extremely toxic and expensive, yet these compounds are used in the production of polymers and fuel additives, making the present hybrid-porous polymer catalyst carbon capture material a green alternative to conventional synthesis methods.

EXAMPLE

The present method is further described in connection with the following laboratory example, which is intended to be non-limiting.

All materials were used as purchased without further purification. 1 g (8.2 mmol; 1 eq.) of 2,6-diaminotoluene was charged into a dry, round bottom flask under an argon atmosphere and dissolved in 75.3 mL (984 mmol; 120 eq.) of trifluoroacetic acid. The solution was cooled to 0° C. while stirring. 3.6 mL (40.9 mmol; 5 eq.) of dimethoxymethane was added dropwise to the solution over a time period of 30 minutes. The solution was then allowed to warm to room temperature (in the range of approximately 20° C. to 25° C.) and became viscous over the course of 40 hours. In a separate Erlenmeyer flask, a solution of 100 mL water and 100 mL of 35% aqueous ammonia was prepared. The reaction mixture was quenched by adding it to the ammonia solution while vigorously stirring, and then allowed to stabilize for 4 hours. The resulting solid in the solution was isolated by filtration, and subsequently washed with 100 mL each of water and acetone. The solid polymer was then dissolved in 100 mL of chloroform and reprecipitated with methanol, which was repeated twice. The solid polymer was again isolated by filtration and dried under vacuum at 40° C. The obtained polymer with intrinsic microporosity (PIM) and including a Tröger's base (TB) was an off-white to pale yellow color, and had a yield of around 95%.

Next, 572 mg (2 mmol) of $RuCl_3*3H_2O$ was dissolved in 30 mL of ethanol. Separately, 250 mg of the polymer obtained above was stirred in 20 mL of ethanol to form a solution that was then added dropwise to the ruthenium solution. The resulting mixture was stirred overnight and then filtered and washed three times with 20 mL of ethanol each. The obtained solid was dried on the filter and subsequently placed in a vacuum at 60° C. for 12 hours. The yield of the resulting PIM-MB-TB-metal(Ru) was 100%.

Figure 4:
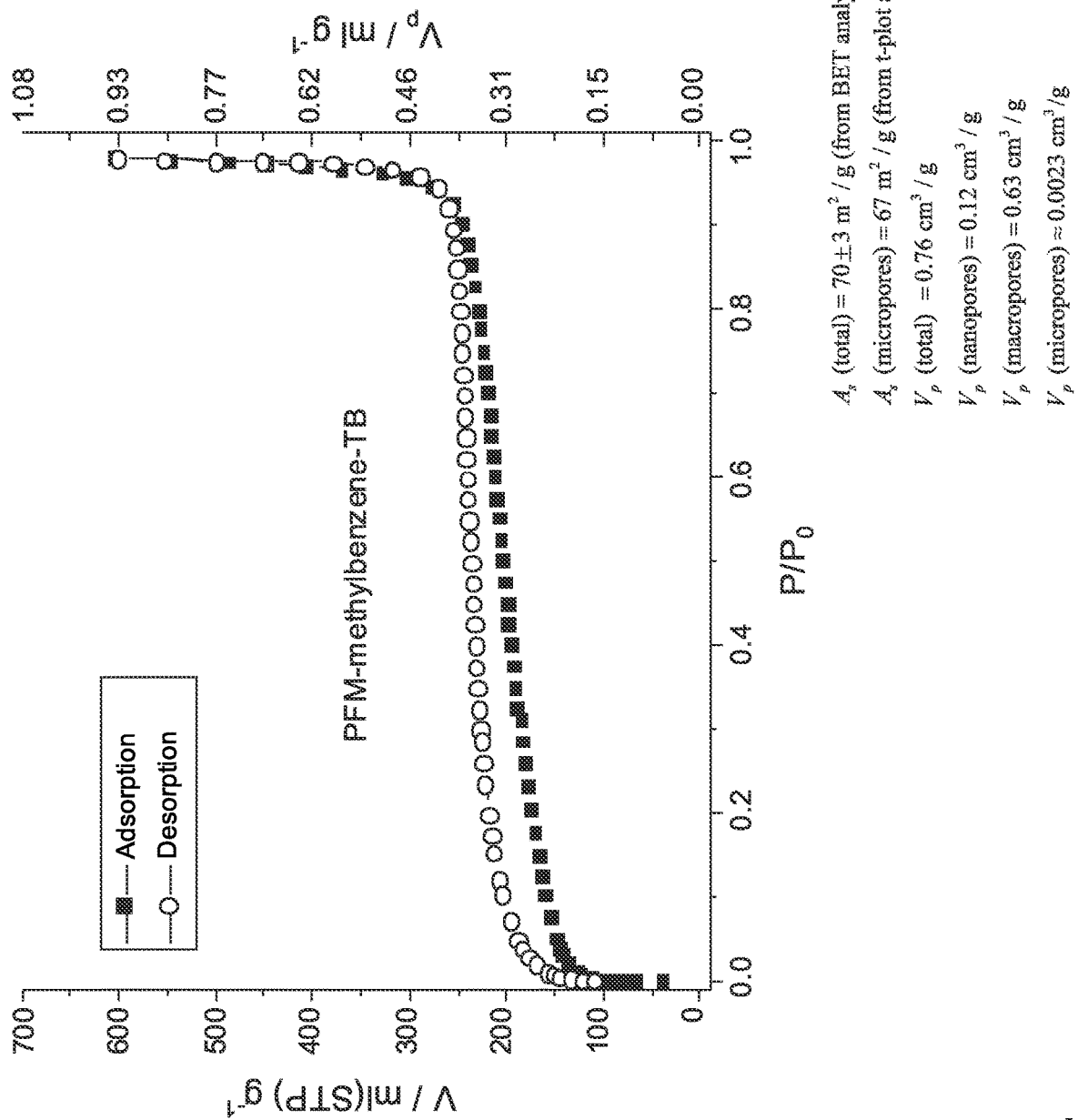
FIG. 4 is a graph of the adsorption and desorption of the hybrid-porous polymer carbon capture material for surface area and porosity analysis.
Figure 5:
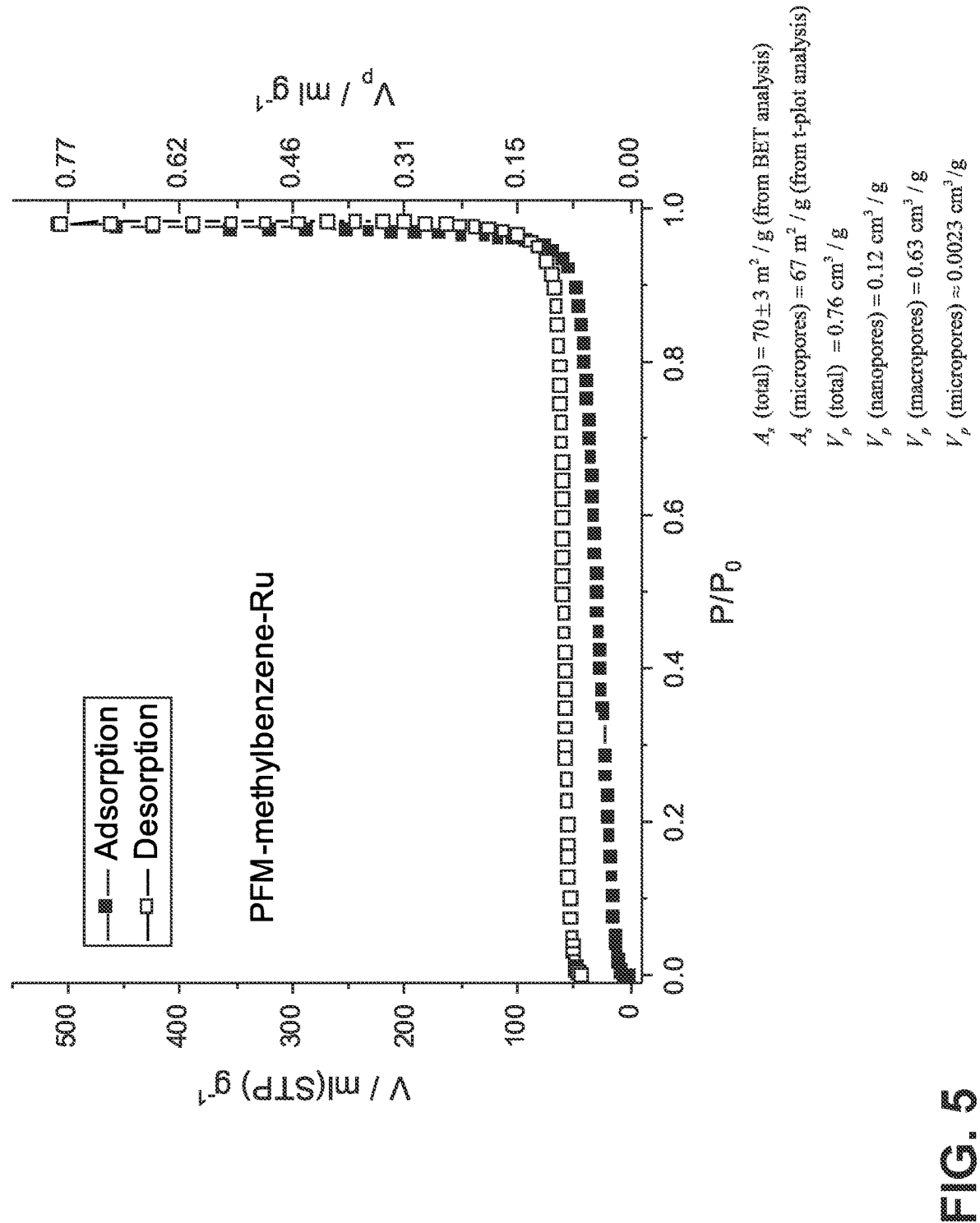
FIG. 5 is a graph of the adsorption and desorption of the hybrid-porous polymer catalyst carbon capture material with the ruthenium catalyst coordinated for surface area and porosity analysis.
Figure 6:
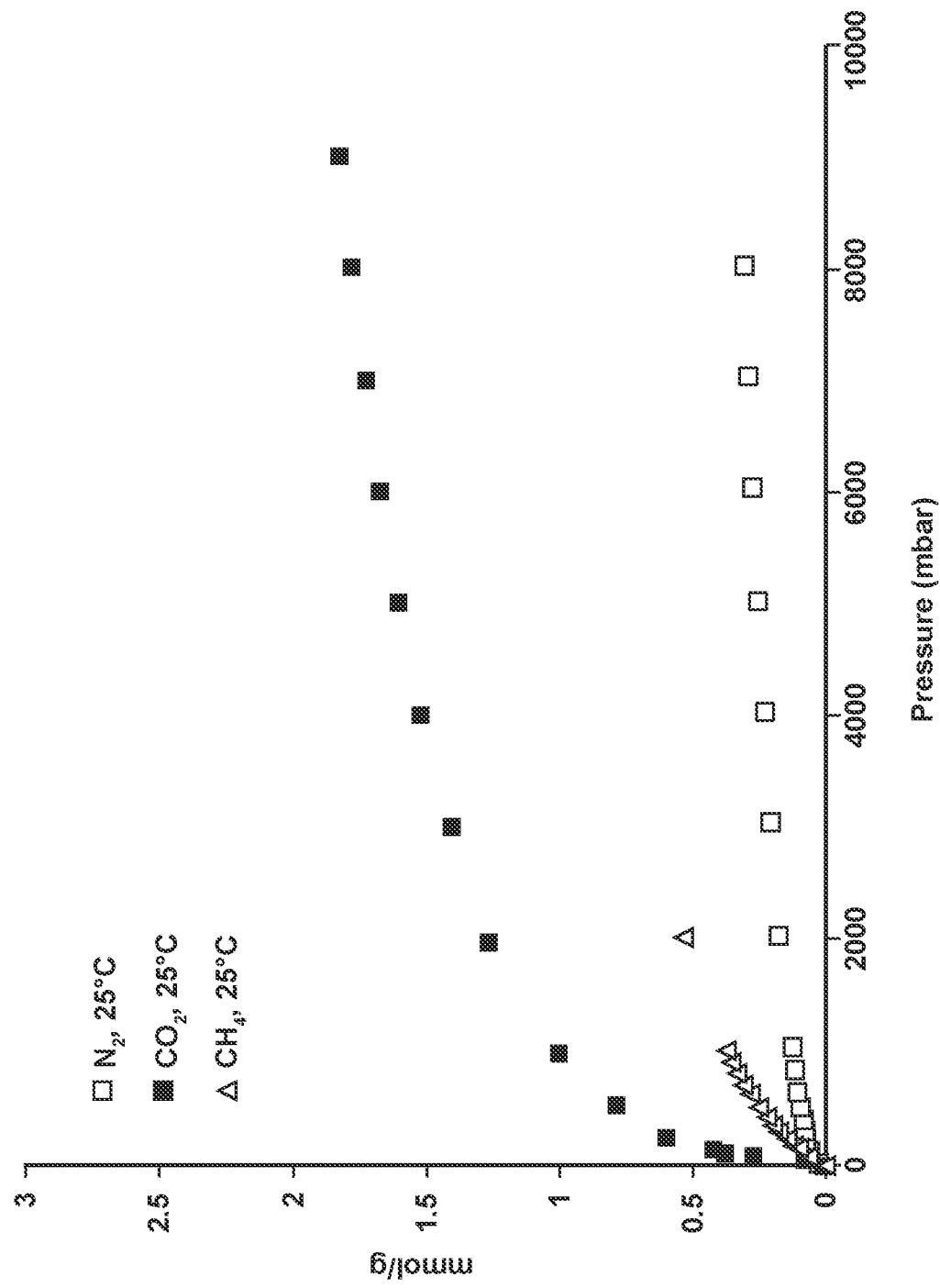
FIG. 6 is a graph of the selectivity and capacity of the hybrid-porous polymer catalyst carbon capture material without the catalyst.
Figure 7:
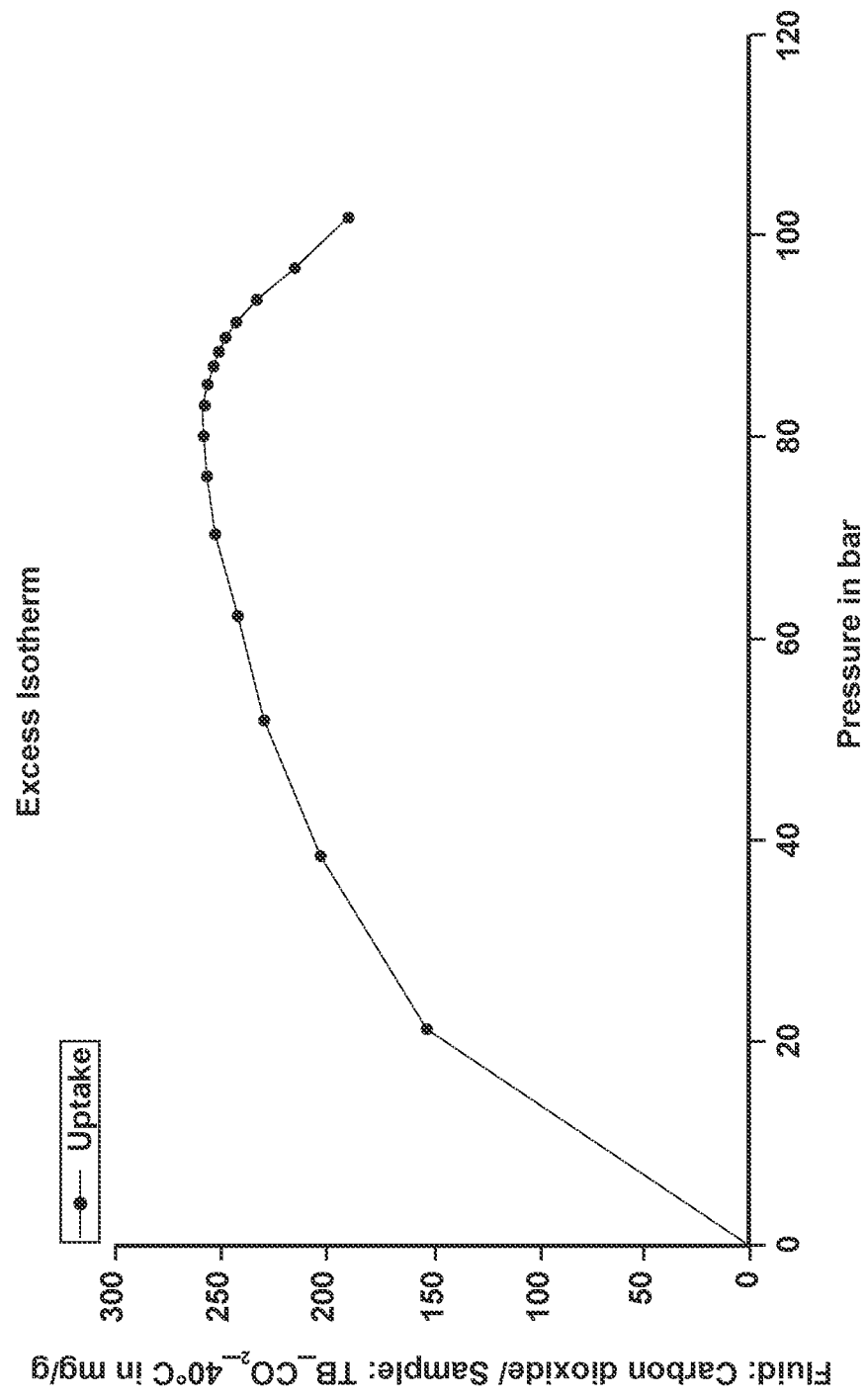
FIG. 7 is a graph of the carbon dioxide uptake (mg/g) of the hybrid-porous polymer carbon capture material at high pressure and 40° C.

With reference to FIGS. 4 and 5, surface area and pore analysis of the resulting PIM-MB-TB and PIM-MB-TB-Ru was conducted on a Micromeritics 2020 Plus. Samples were degassed under helium while heating to 120° C. for 8 hours. Isotherms were collected under nitrogen gas. The $CO_2$, methane, and nitrogen capacity and selectivity of the resulting PIM-MB-TB and PIM-MB-TB-Ru was also analyzed by an Intelligent Gravimetric Analyzer from Hiden Analytical Limited, UK was used to determine the sample sorption capacity and selectivity, the results of which are shown in FIGS. 3 and 6 respectively, up to 10 bar. Approximately 80 mg of sample was loaded into a quartz bucket cell and evacuated to 0.1 bar for 6 hours at 150° C. to degas and dry prior to measurement. The mass uptake (corrected for buoyancy and density of material) was measured as a function of pressure (0-10 bar at 25° C.) to obtain the absorption isotherm. Desorption isotherms were subsequently acquired by measuring the mass as a function of decreasing pressure to ensure that the solubility behavior was reversible and to test for hysteresis effects. The solubility was calculated from the slope of the adsorption isotherm in the low carbon dioxide concentration regime. In addition, the carbon dioxide uptake (mg/g) of the PIM-MB-TB at high pressure (up to 80 bar) at 40° C. is shown in FIG. 7 as measured on a Rubotherm.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A catalytic carbon capture material comprising:
 a microporous polymer including a Tröger's base moiety, wherein the microporous polymer is formed of: (i) one of 2,6-diaminotoluene or spirobi[fluorene] diamine precursors; and ii) dimethoxymethane precursors; and
 a transition metal coordinated within the microporous polymer;
 wherein the catalytic carbon capture material selectively captures carbon dioxide ($CO_2$) and also is a catalyst that simultaneously converts the captured carbon dioxide into one or more carbon dioxide-based products.

2. The catalytic carbon capture material of claim 1, wherein the transition metal is one selected from the group consisting of ruthenium (Ru), iridium (Ir), iron (Fe), copper (Cu), zirconium (Zr), nickel (Ni), and rhodium (Rh).

3. The catalytic carbon capture material of claim 1, wherein the catalytic carbon capture material includes a metal chloride that comprises the transition metal.

4. The carbon capture material of claim 1, wherein the catalytic carbon capture material has a specific surface area in the range of approximately 500 to 700 $m^2/g$.

5. The catalytic carbon capture material of claim 1, wherein the catalytic carbon capture material is in the form of one of a pellet or powder.

6. The catalytic carbon capture material of claim 1, wherein the catalytic carbon capture material is in the form of a membrane.

7. A method of selective carbon dioxide capture and conversion, the method comprising:
 providing the catalytic carbon capture material of claim 1;
 introducing carbon dioxide gas to the catalytic carbon capture material;
 wherein carbon dioxide gas is adsorbed by the catalytic carbon capture material and simultaneously converted into a carbon dioxide-based product while adsorbed by the catalytic carbon capture material.

8. The method of claim 7, wherein the step of converting the carbon dioxide gas into a carbon dioxide-based product includes introducing a hydrogen source to the catalytic carbon capture material to hydrogenate the carbon dioxide.

9. The method of claim 8, wherein the carbon dioxide-based product is one of formic acid, formate, dimethylcarbonate, or furandicarboxylic acid.

10. The method of claim 7, wherein the catalytic carbon capture material selectively adsorbs carbon dioxide over nitrogen gas ($N_2$) and methane ($CH_4$).

11. The method of claim 7, wherein the process is carried out at a temperature in the range of approximately 25° C. to 40° C. and a total pressure of up to approximately 60 to 100 bar.

12. The method of claim 7, wherein the catalytic carbon capture material is in the form of one of a pellet, powder, or a membrane.

13. A method of making the catalytic carbon capture material of claim 1, the method including:
 forming the microporous polymer in solution;
 filtering the solution to isolate the microporous polymer;
 rinsing and drying the microporous polymer;
 dispersing the microporous polymer in an alcohol for purification;
 dispersing the microporous polymer in a solution of metal chloride hydrate in an alcohol to coordinate the metal chloride with the microporous polymer; and
 filtering, rinsing, and drying the microporous polymer coordinated with the metal chloride.

14. The method of claim 13, wherein the metal chloride hydrate is one of a ruthenium, rhodium, iron, copper, nickel, or iridium chloride hydrate.

* * * * *